United States Patent [19]

Ward et al.

[11] 4,119,055
[45] Oct. 10, 1978

[54] TRACTION WHEEL MOTION SENSOR

[75] Inventors: Achard L. Ward; John A. Ward, both of Jackson, Mich.

[73] Assignee: Ward Industries, Inc., Jackson, Mich.

[21] Appl. No.: 759,349

[22] Filed: Jan. 14, 1977

[51] Int. Cl.² .......................... B65G 43/00; G01P 3/02
[52] U.S. Cl. ...................................... 116/74; 73/529; 116/115; 198/502
[58] Field of Search .................. 116/115, 74; 198/502, 198/835; 308/3 R; 73/529

[56] References Cited

U.S. PATENT DOCUMENTS

| 446,881 | 2/1891 | Nye .................................. 198/502 X |
| 703,924 | 7/1902 | Holt .................................... 308/3 R |
| 2,034,110 | 3/1936 | Mechan .............................. 308/3 R |
| 2,629,486 | 2/1953 | Eggleston et al. ................... 198/502 |
| 3,743,913 | 7/1943 | Rebucci .......................... 198/502 X |

Primary Examiner—Daniel M. Yasich
Attorney, Agent, or Firm—Beaman & Beaman

[57] ABSTRACT

The invention pertains to apparatus for sensing the motion of endless conveyors. A housing, on which a traction wheel having a high friction periphery is rotatably mounted, is located adjacent the moving conveyor member to be sensed, and the housing includes an open end through which a portion of the wheel periphery extends for engagement with the moving member. The wheel rotates a shaft which is belted to the input shaft of a motion sensor, preferably of the electrical type, mounted upon the housing. In one embodiment of the invention the traction wheel is adjustably mounted upon the housing whereby adjustment of the wheel to the moving member is facilitated. In another embodiment the wheel housing is of an elongated configuration utilizing a mounting bracket which may be affixed to the housing at the desired position to accommodate the dimensions of the particular installation.

3 Claims, 6 Drawing Figures

TRACTION WHEEL MOTION SENSOR

BACKGROUND OF THE INVENTION

The invention pertains to conveyor motion sensing apparatus utilizing a traction wheel engaging the moving conveyor member to be sensed.

In the material handling art wherein bulk materials are being conveyed by a plurality of conveyors, one conveyor supplying another, it is most important that the designed operating characteristics of the conveyors be maintained during operation in order to prevent clogging and overloading. For instance, in a typical installation wherein a screw or belt conveyor is supplying bulk material to the lower end of a bucket conveyor which is elevating material, malfunctioning of the bucket conveyor will quickly cause clogging if the rate of movement of the bucket conveyor is not sufficient to accomodate the discharge from the supplying screw or belt conveyor. In many bulk material conveying systems a plurality of various types of endless conveyors are often interrelated, and it is necessary that the designed operating specifications be maintained in order to prevent a chain of malfunctions due to one of the conveyors in the system slowing down, or stopping completely, due to overloading, belt slippage, drive motor overheating or burn out, drive train failure, broken parts, or the like.

In order to prevent overloading in conveyor systems it is common practice to use motion sensing devices with the conveyor which continuously sense the rate of conveyor movement, and in the event that conveyor movement varies from a predetermined rate an alarm is energized, or the entire conveyor system may be deactivated, depending on the control system utilized. Such safety devices usually include sensing means of the rotational type capable of discerning small deviations in the rate of velocity of conveyor chain or belt movement, or the rate of rotation of the conveyor drive or idle pulleys.

Rotational motion control sensors for endless conveyors of the bucket or belt type are often mechanically connected to the conveyor idler or tail pulley for rotation thereby as the pulley is rotated by conveyor movement. However, with certain configurations of conveyors it is possible for the rate of rotation of the tail pulley to not accurately represent the condition of the conveyor rate of movement, and several state requirements now insist that conveyor safety devices directly indicate the rate of conveyor movement by directly engaging the conveyor component. However, as conveyors are often custom designed, and are manufactured by a great number of sources, and as the dimensions of conveyor systems are not standardized, considerable difficulty is often encountered in mounting the sensing apparatus for direct engagement with the moving conveyor components. Because of the significant differences in dimensions and configurations of conveyors considerable difficulty has been encountered in endeavoring to provide sensing apparatus which is substantially universal in installation to accommodate the many conveyor installations already in existence.

Sensing devices directly engaging the moving conveyor components may utilize a traction wheel frictionally engaging a movable conveyor component, and it is necessary that the traction wheel be accurately positioned with respect to the engaged conveyor components to insure consistent driving of the wheel. The wheel is associated with a motion sensor wherein the rate of wheel rotation is transferred to the sensor. In an elevating conveyor of the bucket type the traction wheel is normally mounted on the conveyor frame adjacent the backside of the conveyor "up" leg, and the traction wheel may engage the conveyor chain, or the back of the conveyor belt or web to which buckets are attached. As the distance between the conveyor frame or housing to which the sensing apparatus must be attached, and the conveyor components within the housing, widely differ between various conveyor manufacturers and models it is necessary that the sensing apparatus be capable of an extended range of adjustment between the traction wheel shaft and the shaft supporting structure, and motion sensing apparatus of the traction wheel type previous available has not proven satisfactory to meet the requirements of the present market.

SUMMARY OF THE INVENTION

It is an object of the invention to provide motion sensing apparatus to the traction wheel type wherein the apparatus is capable of an extended range of adjustment to permit use with a wide variety of conveyor configurations and dimensions.

A further object of the invention is to provide a traction wheel motion sensor particularly suitable for installation with conveyors which is of an economical construction, easily installable, and which provides accurate sensing of the rate of movement of the conveyor component engaged by the traction wheel.

In the practice of the invention a housing is utilized which defines a chamber in which a traction wheel having a high friction periphery is mounted upon a rotatable shaft. One end of the housing chamber is open wherein a portion of the wheel periphery may extend therethrough for engagement with a moving conveyor component. Mounting structure is defined on the housing wherein the housing may be attached to the conveyor shroud or enclosure, and electrical motion sensing apparatus is mounted upon the housing having an input shaft which is belted to the traction wheel shaft. The entire motion sensing apparatus constitutes a single unit for installation upon existing or new conveyor assemblies, and the installation of the sensing apparatus may be readily accomplished with relatively unskilled labor.

In one embodiment of the invention wherein the moving conveyor component to be engaged by the traction wheel is relatively close to the supporting conveyor shroud a traction wheel is utilized having adjustment plates formed thereon supporting the traction wheel shaft wherein the adjustment plates may be positioned relative to the housing to produce the desired engagement of the traction wheel periphery with the moving belt component.

In another embodiment of the invention an elongated housing for the traction wheel is utilized in conjunction with a mounting bracket which may be selectively attached to the housing at a desired location to provide an extended degree of adjustment beyond that achievable with guided bearing plates for the traction wheel shaft. In this embodiment utilizing an elongated housing a jack shaft is mounted within the housing having pulleys mounted thereon for respective belting to the traction wheel and the motion sensor. Thus, the jack shaft permits a relatively concise housing and traction wheel to be employed, and yet the operating velocity of the motion sensor will be maintained at a relatively high level under normal operating conditions. In this embodiment of the invention the traction wheel extends a fixed distance from an open end of the housing, and the housing includes a cover to confine the components therein, while the motion sensor is mounted upon the housing adjacent the end remote from the traction wheel.

BRIEF DESCRIPTION OF THE DRAWINGS

The forementioned objects and advantages of the invention will be appreciated from the following description and accompanying drawings wherein.

DESCRIPTION OF THE PREFERRED EMBODIMENTS

Figure 1:
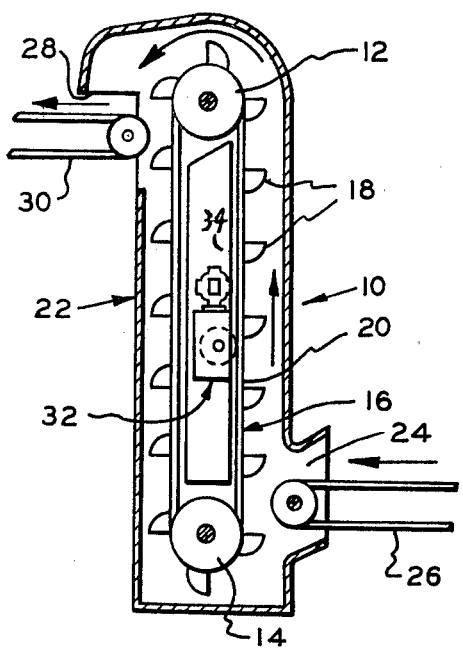
FIG. 1 is a schematic view of an elevating conveyor system utilizing a traction wheel motion sensor in accord with the invention.

A typical installation of a traction wheel motion sensor in accord with the invention is shown in FIG. 1 wherein an elevator conveyor is generally represented at 10. The elevator includes an upper drive pulley 12, a lower pulley 14, and a flexible conveyor member 16 or members, guided on the pulleys on which buckets 18 are affixed. The flexible member 16 may constitute chains, and the pulleys may be in the form of chain sprockets, or the member 16 may be in the form of a belt upon which the buckets 18 are attached. In that pulley 12 rotates in a counterclockwise direction during operation the portion 20 of the conveyor member 16 on which the buckets are loaded constitutes the "up" leg of the unit. The conveyor operating components are encased within a shroud 22 of sheet metal, and the shroud includes an inlet 24 whereby the material to be elevated may be introduced into the buckets 18 from an endless conveyor 26, and, after elevation, the material is dumped from the buckets through the conveyor outlet 28 onto the endless conveyor 30.

If a malfunction occurs in the operation of the elevator conveyor 10 causing a sufficient slowdown or stoppage in the operation of the elevator which would prevent the elevator from accepting the discharge from conveyor 26 the apparatus would quickly become clogged, and it is the purpose of the motion sensor of the invention to immediately indicate such conveyor slowdown or stoppage to prevent such an overload condition. The sensor is so constructed as to be mounted upon the conveyor shroud, and includes a traction wheel which directly engages the "up" leg 20 of the conveyor to sense the rate of movement thereof. As will be appreciated from FIG. 1, a motion sensor 32 constructed in accord with the invention may be located between the vertical legs of the elevator conveyor, and is mounted directly to the conveyor shroud wall 34.

Figure 2:
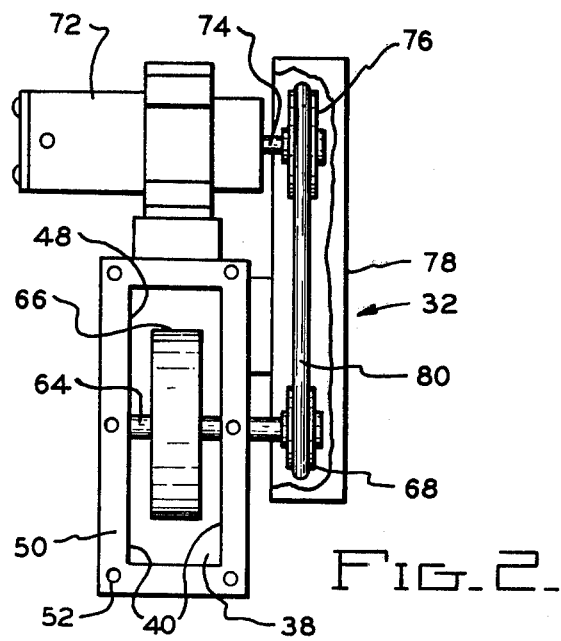
FIG. 2 is an elevational view of the sensor as taken along Section II—II of FIG. 3.
Figure 3:
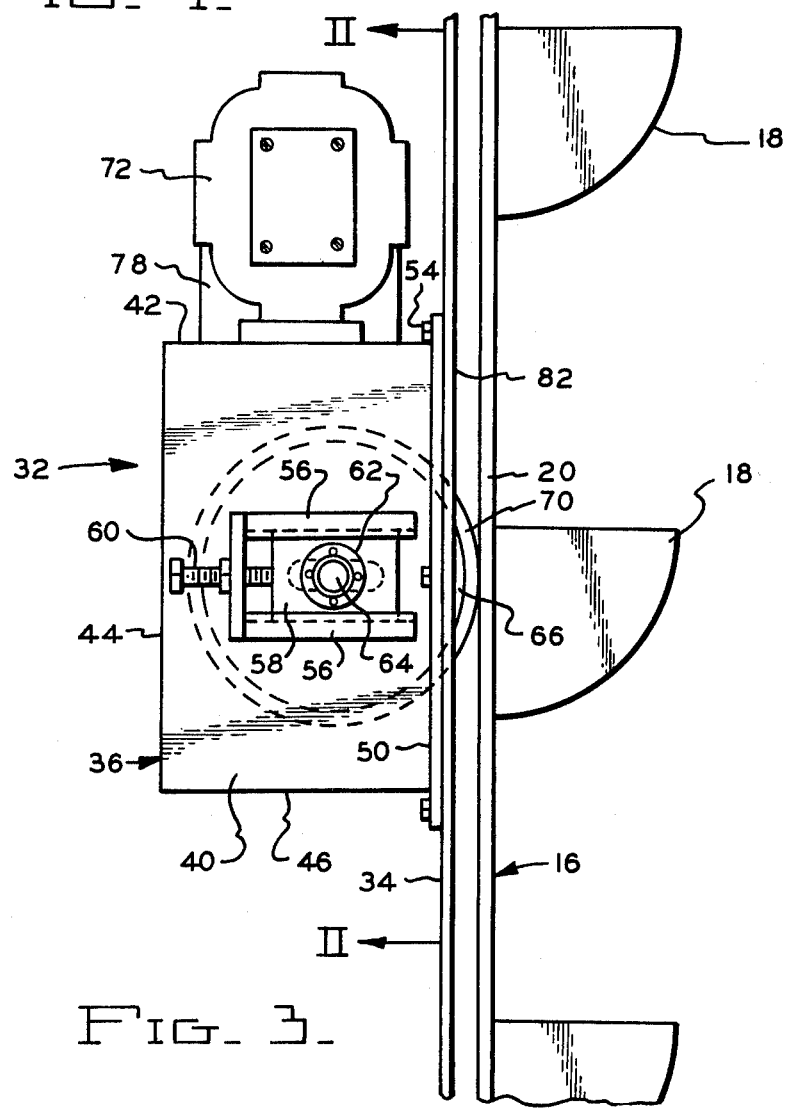
FIG. 3 is a side, elevational, enlarged view of the sensor as mounted upon the conveyor shroud.
Figure 4:
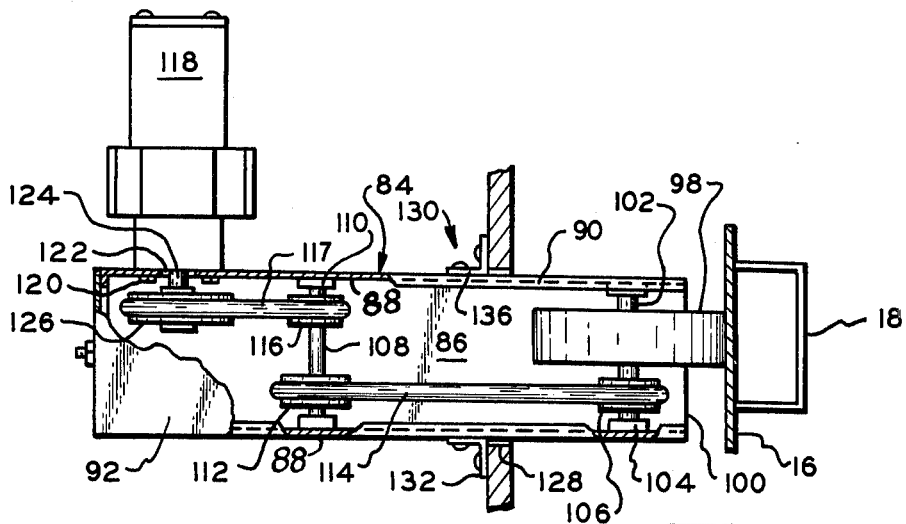
FIG. 4 is a top plan view, partially sectioned, of another embodiment of traction wheel motion sensor in accord with the invention as taken along Section IV—IV of FIG. 5.
Figure 5:
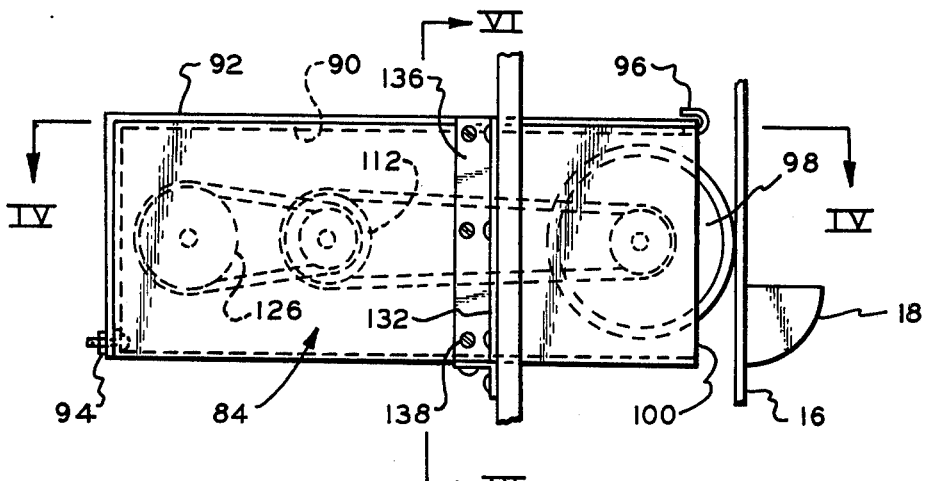
FIG. 5 is a side elevational view of the sensor of FIG. 4.
Figure 6:
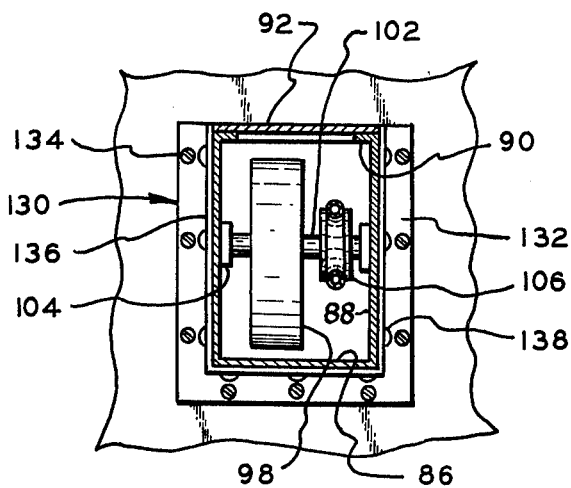
FIG. 6 is an elevational sectional view taken along Section VI—VI of FIG. 5.

FIGS. 2 and 3 illustrate an embodiment of the motion sensor in accord with the invention wherein the conveyor construction is such that the shroud wall 34 is disposed relatively close to the portion 20 of the conveyor member 16, for instance, within 2 inches. The embodiment of the sensor in accord with the invention shown in FIGS. 4 through 6 is for those installations wherein a significantly greater distance exists between the elevator shroud wall and the conveyor member 16. Each embodiment is described in detail below:

With reference to the embodiment of FIGS. 2 and 3, the motion sensor includes a housing 36 which is of a rectangular configuration to define a chamber 38 in which the traction wheel is rotatably supported. The housing 36 includes parallel spaced sidewalls 40 maintained in spaced relationship by an upper wall 42, and end wall 44, and a bottom wall 46. The housing 36 is open at the end opposite end wall 44 to define an opening 48, FIG. 2, and a mounting flange 50 is formed on the housing extending outwardly from the opening 48. A plurality of mounting holes 52 are defined in the flange for receiving fasteners 54 whereby the housing may be firmly attached to the conveyor shroud wall 34.

Each of the housing sidewalls 40 include parallel bearing plate guides 56 mounted thereon whereby a bearing plate 58 is adjustably supported upon each sidewall, and may be adjusted in a direction toward and away from the mounting flange 50 by a screw 60, and the adjustment may be locked by means of a locknut. A bearing 62 is mounted upon each bearing plate 58, and may be of the antifriction type, and these bearing rotatably support a shaft 64 upon which the traction wheel 66 is mounted. As will be appreciated from FIG. 2, the shaft 64 includes an exterior extension upon which belt pulley 68 is mounted.

The traction wheel 66 may be formed of steel, but includes a high friction periphery 70 of rubber or other material having a relatively high coefficient of friction, and the wheel is fixed to the shaft 64 so that the shaft will rotate in unison with the wheel. As will be noted from FIG. 3, the diameter of the wheel 66 is so related to the position of the bearing plates 58 that a portion of the wheel periphery extends through the opening 48 beyond the plane of the mounting flange 50.

Rotation of the shaft is sensed by a rotation sensing device 72 mounted upon the housing upper wall 42. The rotary motion sensing device forms no part of the present invention, and may be of any one of several rotary sensors commercially available for indicating or sensing rates of shaft rotation. The device 72 illustrated is commercially available from the assignee, Ward Industries, Inc. of Jackson, Mich., Model F364-D, and the device includes an input shaft 74 upon which a pulley 76 is mounted. The sensing device 72 will normally be of an electrical type which produces a signal or electrical output if the rate of rotation of input shaft 74 varies from between a predetermined range. The output from the device 72 may be used in conjunction with alarm systems, and/or conveyor motor control systems to produce the desired warning or conveyor control in the event of conveyor malfunctioning. The nature of the particular type of conveyor control produced by the device 72 does not form a part of the present invention, and it is to be understood that it is within the scope of one skilled in the art to utilize the signals from the sensing device in the manner desired to indicate or control the conveyor operation.

A belt guard 78 is mounted upon the housing 36 to encompass the pulleys 68 and 76, and the flexible belt 80 engages the pulley grooves whereby shaft 64 is in a driving relationship to the sensor device input shaft 74.

The traction wheel motion sensor 32 of FIGS. 2 and 3 can readily be installed on existing conveyors, or by original equipment manufacturers on new equipment. Installation only requires that an opening 82 be formed in the housing wall 34 "behind" the moving conveyor member portion 20 which is of sufficient dimension to permit the traction wheel 66 to extend into the shroud and engage portion 20. Of course, such opening 82 defined in the wall 34 will be no larger in dimension than the housing opening 48, and, preferably, will be substantially equal to the opening 48, or slightly smaller. After the opening 82 is formed in the wall 34 the housing 36 is mounted upon the wall by fasteners 54 in the manner apparent from FIG. 3. The screws 60 are then adjusted to position the bearing plates 58, and traction wheel 66, such that the periphery 70 of the traction wheel engages the backside of the conveyor member portion 20. If the conveyor member 16 constitutes a chain the traction wheel engages the same, or if the member 16 constitutes a belt the wheel may engage the belt at any location across its width. Of course, it is important that the wheel 66 engage a continuous portion of the member 16 so that the wheel will rotate at a uniform speed assuming the member portion 20 to be moving upwardly at a uniform velocity. The sensing device 72 is electrically connected to the desired alarm or motor control circuit, not shown, and the aforedescribed installation will cause the traction wheel 66 to be driven by the conveyor member 16 at a rate determined by the rate of movement of the conveyor member, and by the selection of the desired diameters of the pulleys 68 and 76, and the programming of the circuit will produce an alarm or motor control signal only when the rate of movement of conveyor member 16 varies from the desired velocity within the predetermined limits of the device 72 and the control circuit.

The simple mode of installation, and the fact that the traction wheel need only engage a continuous component of the conveyor member 16, permits the aforedescribed apparatus to be used with a wide variety of conveyors to accurately sense the actual rate of movement of the conveyor member. It will be appreciated that while the apparatus in accord with the invention has been illustrated in conjunction with an elevating conveyor 10, that the apparatus may be utilized with any type of endless conveyor, horizontal, vertical, or obliquely oriented, and that the described installation of FIG. 1 is not to be construed in a limiting manner.

The embodiment of FIGS. 4–6 permits a greater degree of adjustment to be achieved between the conveyor wall 34 and the traction wheel motion sensor housing than the previously described embodiment, and this embodiment will be utilized in those conveyor installations wherein the distance separating the conveyor shroud mounting wall 34 and the moving conveyor element is greater than the adjustment capabilities of the previous described embodiment.

In the embodiment of FIGS. 4–6, the housing 84 for the traction wheel motion sensor is of an elongated configuration having a rectangular transverse cross section as will be appreciated from FIG. 6. The housing 84 includes a base 86 of a U-configuration having a bottom and upstanding parallel spaced sidewalls 88. The upper edges of the sidewalls 88 are bent inwardly to form flanges 90, and in like manner the left ends of the sidewalls, FIG. 5, are flanged inwardly. The flanges permit an L-shaped cover 92 to be disposed over the top and left end, FIG. 5, of the base 86 whereby the housing 84 will be closed except at the right end, FIG. 5, which is open. The cover 92 may be maintained in position by a fastener 94 adjacent the base bottom at the left, FIG. 5, and the right edge of the cover is inserted under a lip 96 formed on the sidewalls.

A traction wheel 98 is mounted adjacent the housing open end 100 upon a shaft 102 rotatably supported upon bearings 104 mounted to the inside of the sidewalls 88. The diameter of the traction wheel 98 is normally less than the diameter of the traction wheel 66 utilized with the embodiment of FIGS. 2 and 3, and the shaft 102 is located close enough to the open end 100 such that a portion of the traction wheel friction periphery extends beyond the housing open end as will be apparent from FIGS. 4 and 5. A pulley 106 is affixed to the shaft 102 constituting a portion of the power transmission from the traction wheel to the motion sensing device as later described.

A jack shaft 108 is mounted within the housing 84 upon bearings 110 attached to the housing sidewalls 88, and the shaft has a pulley 112 mounted thereon of a larger diameter than the pulley 106. A flexible belt 114 interconnects the pulleys 104 and 112 wherein rotation of the traction wheel will drive the shaft 108. A second pulley 116 of relatively small diameter, is mounted upon the jack shaft for driving the motion sensing device.

The motion sensing device 118 is affixed to the housing 84 by screws 120, and the device is identical to the device 72 previously described. An opening 122 is formed in the housing through which the sensing device input shaft 124 extends, and the pulley 126 affixed to the input shaft is belted to the jack shaft pulley 116 by belt 117. It will therefore be appreciated that rotation of the traction wheel 98 is transferred through the belts and pulleys to the motion sensing input shaft 124, and the diameter of the pulleys and traction wheel are such that the desired velocity ranges may be maintained commensurate with the sensing limits of the device 118.

The housing 84 extends through a rectangular opening 128 formed in the conveyor housing wall 34, FIG. 4, and the housing is attached to the conveyor wall by a U-shaped angle iron bracket 130 having a flange 132 which is affixed to the conveyor wall by fasteners 134, and a flange 136 which is attached to the sidewalls 88 and the housing bottom by fasteners 138.

When installing the housing 84, the bracket 130 is mounted to the conveyor wall adjacent the wall opening 128, but the bracket is not attached to the housing. The housing 84 is placed upon the bracket and the open end 100 and traction wheel 98 are moved toward the conveyor member 16 until the traction wheel periphery engages the backside of the member 16 sufficiently to drive the traction wheel. Once this position is determined, the housing sidewalls 88 and bottom are drilled to receive the fasteners 138, and, in this manner, the housing 84 is fixed to the mounting bracket and conveyor wall in such a manner to render the device installed and operative. As described above, movement of the member 16 will drive the traction wheel 98, and the sensing device 118, and should the rate of conveyor member motion change within the limits of the device 118 the desired alarm or conveyor motor control will be actuated.

Preferably, the belts 114 and 117 consist of polyurethene tubing which has a long wearing life, relatively high friction characteristics, and the ability to stretch, within limits, and by the use of polyurethene tubing belting, the need for adjusting the shafts 102 and 108 is eliminated.

In practice, the length of the housing 84 may be approximately eighteen inches, and as the bracket 130 may be selectively located as desired within the central region of the housing a wide variety of adjustment is capable with the aforedescribed embodiment. For instance, this embodiment of the traction wheel motion sensor is capable of accommodating conveyors wherein the distance separating the housing wall 34 and the moving conveyor member 16 is between three and ten inches, a range which cannot practically be accommodated by a motion sensor in accord with the embodiment of FIGS. 2 and 3.

It will therefore be appreciated that the traction wheel motion sensor in accord with the invention permits the movable conveying member to be directly engaged, and the motion thereof directly sensed. The sensor of the invention is readily mountable on existing conveyors, as well as readily incorporation into new units and the two embodiments provide a wide range of adjustment to accommodate dimensional differences existing in conveyors of different construction and different manufacturers.

It is appreciated that various modifications to the inventive concept and disclosed embodiments may be apparent to those skilled in the art without departing from the spirit and scope of the invention.

We claim:

1. A traction wheel motion sensor for sensing the movement of a moving conveyor member comprising, in combination, a housing having an open end, mounting means defined on said housing for mounting said housing on a support adjacent the conveyor member to be sensed, a traction wheel shaft rotatably mounted on said housing, a traction wheel fixed on said shaft having a periphery extending from said housing open end, a friction material mounted upon said periphery of said traction wheel, said housing including a pair of spaced sidewalls, means adjustably mounting a bearing plate upon each sidewall for movement toward and away from said open end, a bearing mounted upon each bearing plate, said traction wheel shaft being rotatably mounted in said bearings, and said traction wheel being located within said housing intermediate said sidewalls whereby adjustment of said bearing plates varies the degree of extension of the periphery of said traction wheel from said open end, a rotary motion sensing device mounted on said housing having a rotatable input shaft, and power transmission means drivingly interconnecting said traction wheel shaft and said input shaft whereby said housing is mounted on a support adjacent the conveyor member to be sensed with said wheel periphery in engagement therewith and said input shaft is rotated at a rate dependent upon the rate of movement of the conveyor member.

2. A traction wheel motion sensor for sensing the movement of a moving conveyor member comprising, in combination, a housing, mounting means defined on said housing for mounting said housing on a support adjacent the conveyor member to be sensed, a traction wheel shaft rotatably mounted on said housing, a traction wheel fixed on said shaft having a periphery extending from said housing, a rotary motion sensing device mounted on said housing having a rotatably input shaft, and power transmission means including belt pulleys mounted on said traction wheel and input shaft and a flexible drive belt interconnecting said pulleys drivingly interconnecting said traction wheel shaft and said input shaft whereby said housing is mounted on a support adjacent the conveyor member to be sensed with said wheel periphery in engagement therewith and said input shaft is rotated at a rate dependent upon the rate of movement of the conveyor member, said housing being of an elongated configuration having first and second ends and sidewalls, an opening defined in said first end, said traction wheel shaft and traction wheel being mounted on said housing adjacent said first end whereby said wheel periphery extends from said opening, means mounting said motion sensing device adjacent said housing second end, and housing mounting means comprising a flanged bracket engaging said sidewalls of said housing and selectively positionable on said sidewalls between said first and second ends whereby the distance between said bracket and housing first end may be selectively varied to adjustably mount said housing on its support.

3. In a traction wheel motion sensor as in claim 2 wherein said power transmission means includes the belt pulleys mounted on said traction wheel and input shafts, a jack shaft rotatably mounted on said housing intermediate said traction wheel shaft and input shaft having belt pulleys thereon, and a first flexible belt interconnecting the pulley on said traction wheel shaft and a pulley on said jack shaft, and a second flexible belt interconnecting the pulley on said input shaft with a pulley on said jack shaft.

* * * * *